United States Patent
Butala et al.

(10) Patent No.: US 11,183,827 B1
(45) Date of Patent: Nov. 23, 2021

(54) INTERMEDIATE BUSWAY SUPPORT

(71) Applicant: Faith Technologies, Inc., Menasha, WI (US)

(72) Inventors: Daniel Richard Butala, White, GA (US); Cory James Holmes, Appleton, WI (US); Noah G. Pepin, Grand Chute, WI (US); Ralf R. Kelm, Brookfield, WI (US)

(*) Notice: Subject to any disclaimer, the term of this patent is extended or adjusted under 35 U.S.C. 154(b) by 284 days.

(21) Appl. No.: 16/295,015

(22) Filed: Mar. 7, 2019

(51) Int. Cl.
*H02G 5/02* (2006.01)
*F16M 13/02* (2006.01)

(52) U.S. Cl.
CPC .......... *H02G 5/025* (2013.01); *F16M 13/027* (2013.01)

(58) Field of Classification Search
None
See application file for complete search history.

(56) References Cited

U.S. PATENT DOCUMENTS

| | | | | |
|---|---|---|---|---|
| 1,409,927 A | * | 3/1922 | Christensen | H02G 5/025 |
| | | | | 174/149 B |
| 2,356,708 A | * | 8/1944 | Sileck | H02G 5/025 |
| | | | | 296/204 |
| 2,840,630 A | * | 6/1958 | Born | H02G 5/06 |
| | | | | 174/100 |
| 2,966,540 A | | 12/1960 | Christensen | |
| 2,966,542 A | | 12/1960 | Shields | |
| 3,006,591 A | * | 10/1961 | Somes, Jr. | H02G 5/025 |
| | | | | 248/317 |
| 3,034,753 A | * | 5/1962 | Johnston | H02G 5/06 |
| | | | | 248/59 |
| 3,190,604 A | | 6/1965 | Jorgensen et al. | |
| 3,226,472 A | | 12/1965 | Bamstead et al. | |
| 3,783,320 A | | 1/1974 | Clement | |
| 4,790,060 A | * | 12/1988 | Council | F16L 3/243 |
| | | | | 29/525.08 |
| 4,886,940 A | * | 12/1989 | Gagnon | H01R 25/162 |
| | | | | 174/88 B |
| 5,060,891 A | | 10/1991 | Nagy et al. | |
| 5,160,107 A | * | 11/1992 | Perrault | H02G 3/263 |
| | | | | 248/327 |

(Continued)

FOREIGN PATENT DOCUMENTS

| | | | | |
|---|---|---|---|---|
| CA | 2049252 C | * | 5/2000 | ............... H02G 5/06 |
| EP | 0547473 A1 | | 8/1992 | |

(Continued)

*Primary Examiner* — Timothy J. Dole
*Assistant Examiner* — Muhammed Azam
(74) *Attorney, Agent, or Firm* — Randall W. Fieldhack

(57) ABSTRACT

An apparatus for providing support to a first vertical busway extending between a floor surface and a ceiling surface, the first busway having first and second lateral faces, includes a frame having first and second vertical struts, wherein the first and second vertical struts are attached to the floor surface adjacent the first and second lateral faces; a lower pair of hangers each attached to the floor surface, wherein one of the lower pair of hangers is attached to the first lateral face, and wherein the other of the lower pair of hangers is attached to the second lateral face; and an upper pair of hangers vertically spaced apart from the lower pair of hangers, wherein the upper pair of hangers are attached to the first and second vertical struts and to the first and second lateral faces.

19 Claims, 4 Drawing Sheets

(56) References Cited

U.S. PATENT DOCUMENTS

| | | | | |
|---|---|---|---|---|
| 5,160,284 A * | 11/1992 | Krom | | H02G 3/26 403/44 |
| 5,828,006 A | 10/1998 | Graham et al. | | |
| 7,091,417 B1 * | 8/2006 | Jur | | H02B 1/21 174/149 B |
| 10,238,212 B1 * | 3/2019 | Brown | | F16M 13/027 |
| 2002/0117322 A1 * | 8/2002 | Hilgert | | H02G 3/0608 174/99 B |
| 2004/0149862 A1 * | 8/2004 | Yamada | | H02G 5/025 248/49 |
| 2004/0217239 A1 * | 11/2004 | Chuang | | F16M 11/28 248/125.8 |
| 2007/0125928 A1 * | 6/2007 | Klein | | F16M 11/10 248/544 |
| 2007/0170333 A1 * | 7/2007 | Moreno | | A47G 25/02 248/317 |
| 2007/0212932 A1 * | 9/2007 | Jur | | H02B 1/21 439/507 |
| 2008/0110107 A1 * | 5/2008 | Decker | | E04F 21/185 52/127.2 |
| 2008/0116333 A1 * | 5/2008 | Chang | | F16M 11/28 248/200.1 |
| 2009/0050756 A1 * | 2/2009 | Newkirk | | A61B 50/13 248/176.1 |
| 2009/0146020 A1 * | 6/2009 | Moore | | F16M 13/027 248/68.1 |
| 2009/0196012 A1 * | 8/2009 | Jur | | H02G 3/105 361/825 |
| 2011/0186533 A1 * | 8/2011 | Thrush | | A47B 57/20 211/113 |
| 2011/0186697 A1 * | 8/2011 | Hickle | | E04B 9/18 248/75 |
| 2012/0047836 A1 * | 3/2012 | Sareyka | | E04B 9/068 52/506.06 |
| 2015/0316177 A1 * | 11/2015 | Knutson | | F16M 13/02 248/59 |
| 2015/0316203 A1 * | 11/2015 | Zhang | | F16M 13/02 248/65 |
| 2015/0327936 A1 * | 11/2015 | Coleman | | A61G 12/007 211/1.52 |
| 2016/0010794 A1 * | 1/2016 | Lu | | F16H 19/04 248/278.1 |
| 2016/0069480 A1 * | 3/2016 | Rego | | F16G 11/146 248/65 |
| 2016/0379530 A1 * | 12/2016 | Lewis | | F16B 2/005 248/475.1 |
| 2017/0102108 A1 * | 4/2017 | Baker | | F16M 11/046 |
| 2017/0122492 A1 * | 5/2017 | Silva | | F16M 11/045 |
| 2017/0307130 A1 * | 10/2017 | Kohshima | | A47F 5/00 |
| 2018/0041016 A1 * | 2/2018 | Frank | | F16M 13/027 |
| 2018/0104519 A1 * | 4/2018 | Ostrobrod | | F16M 13/027 |
| 2020/0191328 A1 * | 6/2020 | Rawas | | F16M 13/027 |

FOREIGN PATENT DOCUMENTS

| | | |
|---|---|---|
| JP | 4404669 B2 | 1/2010 |
| JP | 4434464 B2 | 3/2010 |

\* cited by examiner

INTERMEDIATE BUSWAY SUPPORT

BACKGROUND

Busways are used in multi-level buildings to enclose the buses that carry electricity to the levels of the building. Buses can be highly energized and therefore need to be protected from unauthorized or inadvertent contact. Busways can run generally vertically from level to level through apertures in the floors/ceilings. Busways can also run generally horizontally across a level to supply electricity to different areas of that level. In current applications, horizontal busways are typically hung from a ceiling or a wall, while vertical busways are supported with hangers attached to the floor or an intervening structure such as a curb.

With modern construction and higher ceiling heights, the distance between the upper surface of one level and the lower surface of the next level up can easily exceed the recommended unsupported span of a given busway. For example, with some busway designs, runs longer than ten feet for outdoor-rated busways or sixteen feet for indoor-rated busways are not allowed without intermediate supports. Longer runs in a vertical busway also mean that greater weight is carried by the hangers in the floor above. Too much vertical and horizontal movement is encountered. No intermediate supports are currently available, particularly if there are not walls immediately adjacent both sides of the vertical busway. Even if walls are near, the walls are often covered with other electrical equipment and might be constructed from concrete block with inadequate strength to support attached bracing.

SUMMARY

The present disclosure solves these issues by providing a frame surrounding one or more busways. Such a frame accommodates both a lower pair of spring hanger or their equivalent and an upper pair of spring hangers or their equivalent to provide both floor-level and intermediate support for the busway(s).

The primary benefit to this design is providing required support to a vertical busway riser while still allowing the busway to flex vertically via the spring hangers. This flexibility accommodates busway contraction and expansion due to environmental conditions and the heat generated in the busway when the bus is energized.

In one aspect, the present disclosure provides an apparatus for providing support to a first vertical busway extending between a floor surface and a ceiling surface, the first busway having first and second lateral faces, the apparatus including a frame having first and second vertical struts, wherein the first vertical strut is attached to the floor surface adjacent the first lateral face, and wherein the second vertical strut is attached to the floor surface adjacent the second lateral face; a lower pair of hangers each attached to the floor surface, wherein one of the lower pair of hangers is attached to the first lateral face, and wherein the other of the lower pair of hangers is attached to the second lateral face; and an upper pair of hangers vertically spaced apart from the lower pair of hangers, wherein one of the upper pair of hangers is attached to the first vertical strut and to the first lateral face, and wherein the other of the upper pair of hangers is attached to the second vertical strut and to the second lateral face.

In another aspect, the present disclosure provides an apparatus for providing support to a first vertical busway extending between a floor surface and a ceiling surface, the first busway having first and second lateral faces, the apparatus including a frame having first, second, third, and fourth vertical struts, wherein the first and third vertical struts are attached to the floor surface adjacent the first lateral face, and wherein the second and fourth vertical struts are attached to the floor surface adjacent the second lateral face; a first horizontal support connecting the first and third vertical struts; a second horizontal support connecting the second and fourth vertical struts; a lower pair of hangers each attached to the floor surface, wherein one of the lower pair of hangers is attached to the first lateral face, and wherein the other of the lower pair of hangers is attached to the second lateral face; and an upper pair of hangers vertically spaced apart from the lower pair of hangers, wherein one of the upper pair of hangers is attached to the first horizontal support and to the first lateral face, wherein the other of the upper pair of hangers is attached to the second horizontal support and to the second lateral face, and wherein the upper pair of hangers is spaced to be intermediate the floor surface and the ceiling surface.

In another aspect, the present disclosure provides an apparatus for providing support to first and second vertical busways extending between a floor surface and a ceiling surface, the first busway having first and second lateral faces, the second busway having third and fourth lateral faces, the apparatus including a frame having first, second, third, and fourth vertical struts, wherein the first and third vertical struts are attached to the floor surface adjacent the first lateral face, and wherein the second and fourth vertical struts are attached to the floor surface adjacent the second lateral face; a first horizontal support connecting the first and third vertical struts; a second horizontal support connecting the second and fourth vertical struts; a lower pair of hangers each attached to the floor surface, wherein one of the lower pair of hangers is attached to the first lateral face, and wherein the other of the lower pair of hangers is attached to the second lateral face. The apparatus also includes an upper pair of hangers vertically spaced apart from the lower pair of hangers, wherein one of the upper pair of hangers is attached to the first horizontal support and to the first lateral face, wherein the other of the upper pair of hangers is attached to the second horizontal support and to the second lateral face, and wherein the upper pair of hangers is spaced to be intermediate the floor surface and the ceiling surface; a third pair of hangers each attached to the floor surface, wherein one of the third pair of hangers is attached to the third lateral face, and wherein the other of the third pair of hangers is attached to the fourth lateral face; and a fourth pair of hangers vertically spaced apart from the third pair of hangers, wherein one of the fourth pair of hangers is attached to the first horizontal support and to the third lateral face, and wherein the other of the fourth pair of hangers is attached to the second horizontal support and to the fourth lateral face.

BRIEF DESCRIPTION OF THE DRAWINGS

The foregoing and other features and aspects of the present disclosure and the manner of attaining them will become more apparent, and the disclosure itself will be better understood by reference to the following description, appended claims and accompanying drawings, where:

Figure 1:
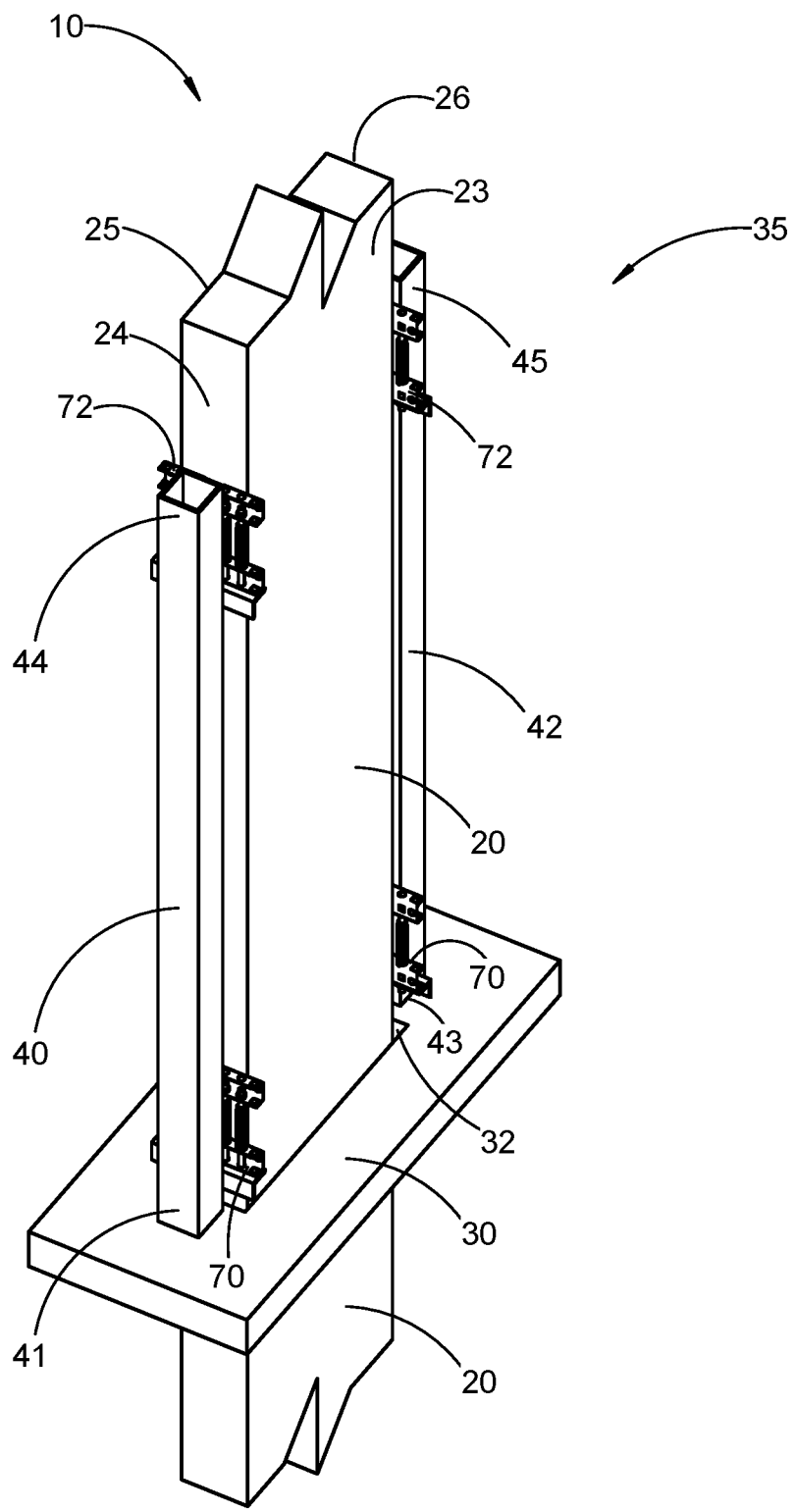
FIG. 1 representatively illustrates a simplified partial perspective view of an intermediate busway support of the present disclosure.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

Reference now will be made in detail to various aspects of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one aspect, can be used on another aspect to yield a still further aspect. Thus, it is intended that the present disclosure covers such modifications and variations as come within the scope of the appended claims and their equivalents.

The present disclosure is directed to an intermediate busway support including a frame surrounding one or more generally vertical busway(s) that pass through the floor of a given level in a building and in many cases extend through the ceiling of that level. The frame includes a lower pair of spring hangers or their equivalent, where the lower pair of spring hangers supports the busway by connecting the busway to the frame. The frame also includes an upper pair of spring hangers or their equivalent, where the upper pair of spring hangers is vertically spaced apart from the lower pair, and where the upper pair also supports the busway by connecting the busway to the frame.

This intermediate busway support design provides required support to a vertical busway while still allowing the busway to flex vertically due to the use of spring hangers. This flexibility accommodates busway contraction and expansion due to environmental conditions, the heat generated in the busway when the bus is energized, and the reduction in heat generation when the bus is de-energized.

As used herein, the term "attached" means that one element can be affixed or otherwise connected directly to a second element, or that one element can be indirectly connected to a second element through one or more intervening elements. In other words, a statement that element A is attached to element B does not preclude the inclusion of one or more intervening elements. Further, an attachment can be more temporary, such as with a clamp, a bolt, or any other suitable mechanism, or the attachment can be more permanent, such as by welding or other suitable connection process.

As used herein, the term "floor" means either the floor surface of a given level of a building, or a generally planar structure attached to the floor surface that creates a raised floor surface. For example, when a busway rises through the floor of a given level of a building, NEC 368.10(C)(2)(b) requires a four-inch curb surrounding the busway to prevent liquid penetration through the floor aperture. The upper planar surface of such a curb then becomes the floor or floor surface.

The present disclosure is directed to an intermediate busway support 10 that provides necessary support to a vertical busway 20 extending between the floor 30 of a given level in a building and the ceiling (not shown) of that level of the building. The vertical busway 20 can extend through the ceiling (not shown) and/or through an aperture 32 in the floor 30. The intermediate busway support 10 can also provide necessary support to a vertical busway 20 extending from the floor 30 of a given level in a building toward but not reaching the ceiling of that level of the building. The vertical busway 20 supported in this aspect is generally rectangular in horizontal cross section and includes first and second lateral faces 24, 26 connecting first and second transverse faces 23, 25.

Figure 2:
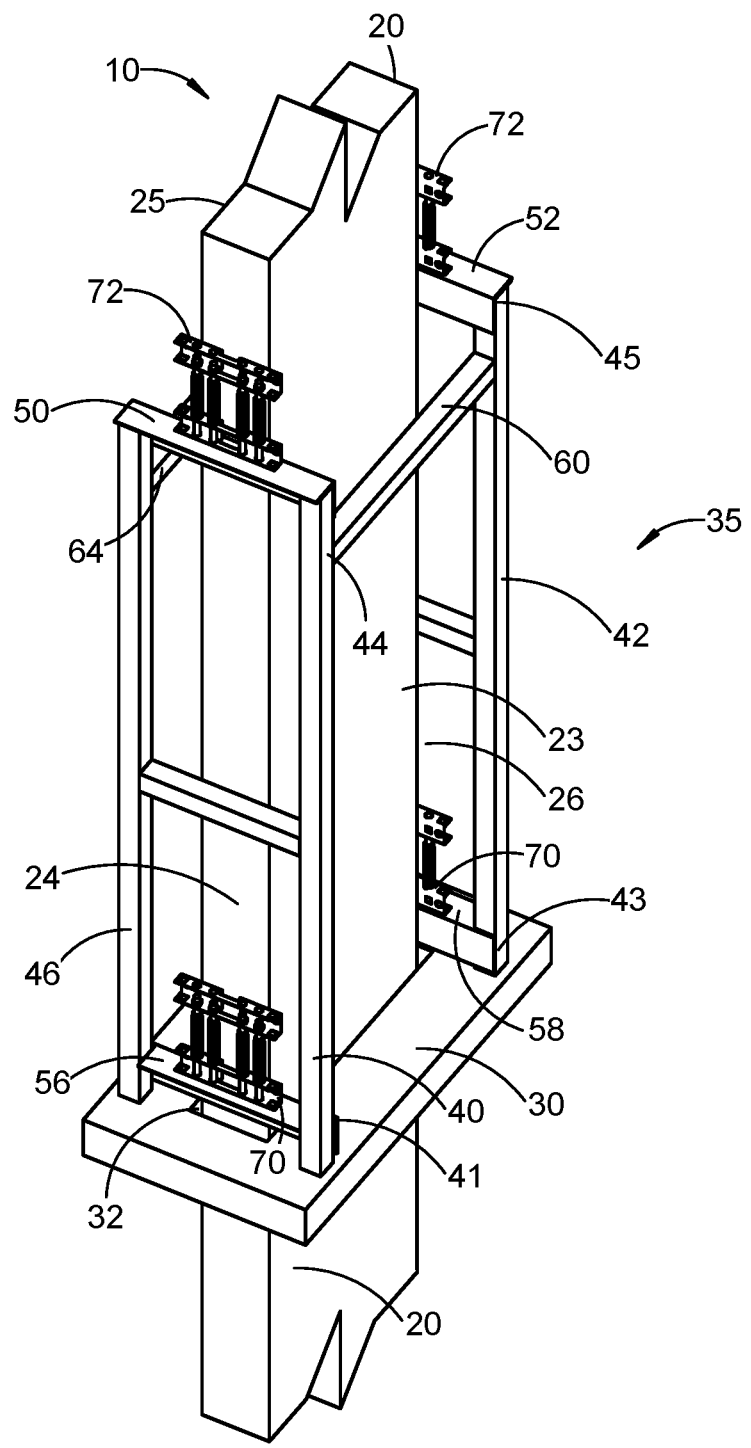
FIG. 2 representatively illustrates a simplified partial perspective view of alternative aspect of the intermediate busway support of FIG. 1.
Figure 3:
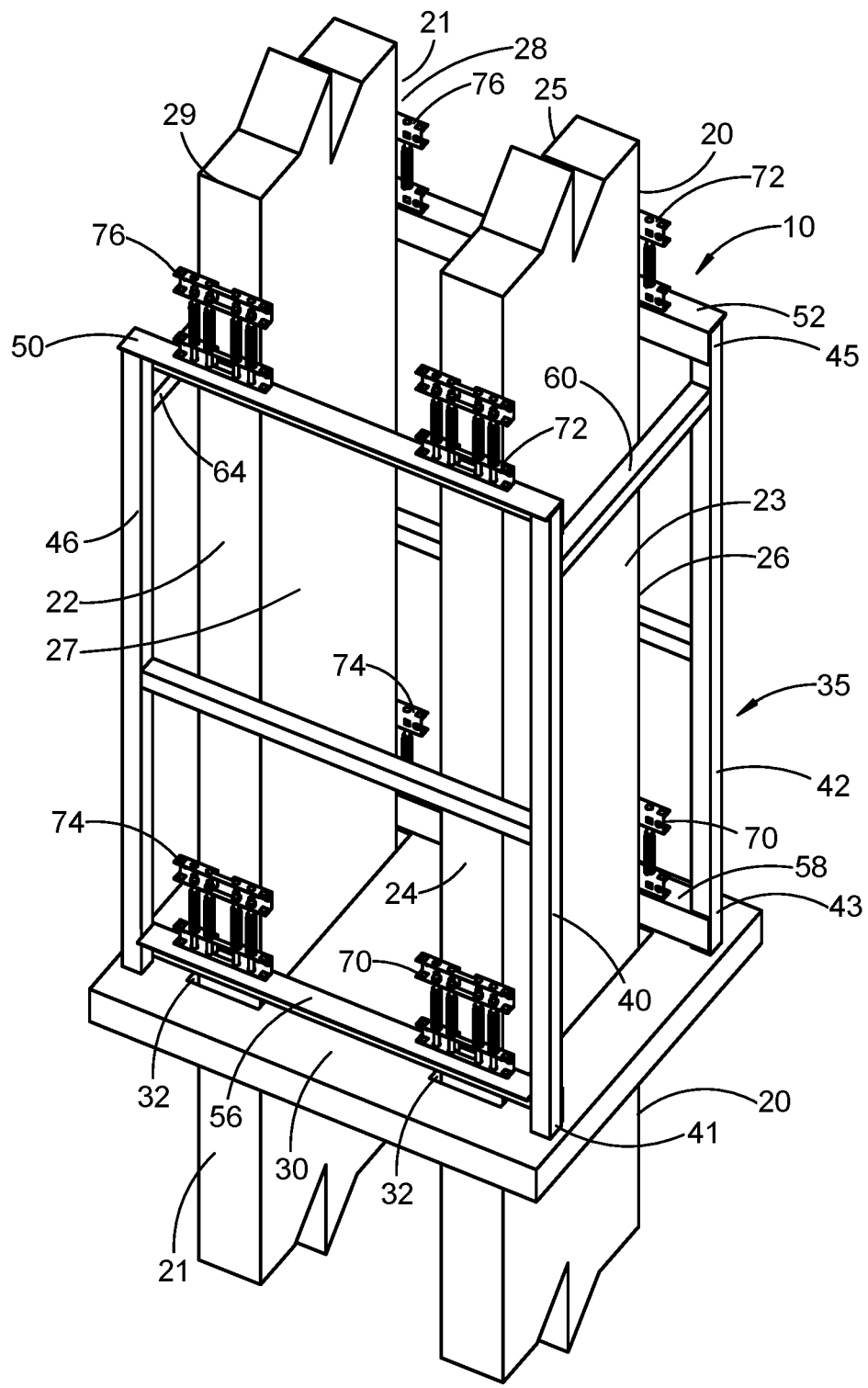
FIG. 3 representatively illustrates a simplified partial perspective view of another alternative aspect of the intermediate busway support of FIG. 1.

As illustrated in FIGS. 1-3, the intermediate busway support 10 includes at least a frame 35, a lower pair of spring hangers 70, and an upper pair of spring hangers 72 vertically spaced apart from the lower pair of spring hangers 70.

Turning specifically to FIG. 1, the frame 35 includes first and second vertical struts 40, 42 having proximal ends 41, 43 and distal ends 44, 45. The proximal end 41 of the first vertical strut 40 is attached to the floor surface 30 adjacent the first lateral face 24 of the busway 20. The proximal end 43 of the second vertical strut 42 is attached to the floor surface 30 adjacent the second lateral face 26 of the busway 20. The first and second vertical struts 40, 42 can be embedded in the floor or curb 30, can be bolted to the floor or curb 30, or can be attached by any suitable means.

Each of the first and second vertical struts 40, 42 can be a pipe, a square tube, a round tube, or other suitable structural shape. Each of the first and second vertical struts 40, 42 can be hollow, solid, filled with a different material, or of any other suitable structure. Finally, each of the first and second vertical struts 40, 42 can be made from steel, other metal, PVC or other polymer, composite, non-composite, or any other suitable material. Each of the first and second vertical struts 40, 42 should be selected to be of a size and strength to support the lower pair of spring hangers 70, the upper pair of spring hangers 72, and the share of the busway weight to be carried by that frame 35, including an engineered safety factor.

The spring hangers or their equivalent described in this disclosure can be any suitable hanger-like device, such as those described in U.S. Patent Application Publication No. 2018/0041016 A1 to Frank, et al., and such as those available from Schneider Electric. These and all other suitable types of spring hangers, fixed hangers, and alternative hanger mechanisms are included in the terms "hanger" and "spring hanger."

The intermediate busway support 10 includes a first or lower pair of spring hangers 70. The lower pair of spring hangers 70 can be attached directly to the floor surface 30. In another aspect of the present disclosure, the lower pair of spring hangers 70 can be attached to the first and second vertical struts 40, 42. One of the lower pair of spring hangers 70 can be attached to the first vertical strut 40 and to the first lateral face 24 of the busway 20. The other of the lower pair of spring hangers 70 can be attached to the second vertical strut 42 and to the second lateral face 26 of the busway 20.

The intermediate busway support 10 also includes a second or upper pair of spring hangers 72. The upper pair of spring hangers 72 can be attached to the first and second vertical struts 40, 42. One of the upper pair of spring hangers 72 can be attached to the first vertical strut 40 and to the first lateral face 24 of the busway 20. The other of the upper pair of spring hangers 72 can be attached to the second vertical strut 42 and to the second lateral face 26 of the busway 20.

Each of the upper pair of spring hangers 72 is vertically spaced apart from one of the lower pair of spring hangers 70, as shown in FIG. 1. The upper pair of spring hangers 72 is positioned such that the linear distance from the floor surface 30 to the upper pair of spring hangers 72 is less than the maximum unsupported distance designated by the busway manufacturer. Similarly, the linear distance from the upper pair of spring hangers 72 to the ceiling surface should also be less than the maximum unsupported distance designated by the busway manufacturer. The maximum unsupported distance is typically either ten feet or sixteen feet, but can be any other distance designated by the busway manufacturer.

In another aspect of the present disclosure illustrated in FIG. 2, the frame 35 of the intermediate busway support 10 can include third vertical strut 46 and fourth vertical strut (hidden from view behind the busway 20 but identical to the third vertical strut 46) in addition to the first and second vertical struts 40, 42. The third vertical strut 46 and fourth vertical strut include proximal and distal ends. The third vertical strut 46 and fourth vertical strut are preferably but not required to be of the same design and material as the first and second vertical struts 40, 42 as described above. In this aspect, the proximal ends of the first and third vertical struts 40, 46 are attached to the floor surface 30 adjacent the first lateral face 24 of the busway 20. The proximal ends of the second vertical strut 42 and the fourth vertical strut are attached to the floor surface 30 adjacent the second lateral face 26 of the busway 20.

The frame 35 can also include a first horizontal support 50 connecting the first and third vertical struts 40, 46. Although the first horizontal support 50 can connect the first and third vertical struts 40, 46 at any point between the proximal and distal ends of the first and third vertical struts 40, 46, the first horizontal support 50 is preferably connected to the first and third vertical struts 40, 46 at the distal ends of the first and third vertical struts 40, 46, as shown in FIG. 2.

The frame 35 can also include a second horizontal support 52 connecting the second vertical strut 42 and the fourth vertical strut. Although the second horizontal support 52 can connect the second vertical strut 42 and the fourth vertical strut at any point between the proximal and distal ends of the second vertical strut 42 and the fourth vertical strut, the second horizontal support 52 is preferably connected to the second vertical strut 42 and the fourth vertical strut at the distal ends of the second vertical strut 42 and the fourth vertical strut, as shown in FIG. 2.

The frame 35 can also include a third horizontal support 56 connecting the first and third vertical struts 40, 46. Although the third horizontal support 56 can connect the first and third vertical struts 40, 46 at any point between the proximal and distal ends of the first and third vertical struts 40, 46, the third horizontal support 56 is preferably connected to the first and third vertical struts 40, 46 at the proximal ends of the first and third vertical struts 40, 46, as shown in FIG. 2. The third horizontal support 56 can be connected to the first and third vertical struts 40, 46 using mechanical hardware, welding, or any other suitable mechanism or process.

The frame 35 can also include a fourth horizontal support 58 connecting the second vertical strut 42 and the fourth vertical strut. Although the fourth horizontal support 58 can connect the second vertical strut 42 and the fourth vertical strut at any point between the proximal and distal ends of the second vertical strut 42 and the fourth vertical strut, the fourth horizontal support 58 is preferably connected to the second vertical strut 42 and the fourth vertical strut at the proximal ends of the second vertical strut 42 and the fourth vertical strut, as shown in FIG. 2. The fourth horizontal support 58 can be connected to the second vertical strut 42 and the fourth vertical strut using mechanical hardware, welding, or any other suitable mechanism or process.

The intermediate busway support 10 in this aspect includes a first or lower pair of spring hangers 70. The lower pair of spring hangers 70 can be attached directly to the floor surface 30. In another aspect of the present disclosure, the lower pair of spring hangers 70 can be attached to the third and fourth horizontal supports 56, 58. One of the lower pair of spring hangers 70 can be attached to the third horizontal support 56 and to the first lateral face 24 of the busway 20. The other of the lower pair of spring hangers 70 can be attached to the fourth horizontal support 58 and to the second lateral face 26 of the busway 20.

The intermediate busway support 10 in this aspect also includes a second or upper pair of spring hangers 72. The upper pair of spring hangers 72 can be attached to the first and second horizontal supports 50, 52. One of the upper pair of spring hangers 72 can be attached to the first horizontal support 50 and to the first lateral face 24 of the busway 20. The other of the upper pair of spring hangers 72 can be attached to the second horizontal support 52 and to the second lateral face 26 of the busway 20.

Each of the upper pair of spring hangers 72 is vertically spaced apart from one of the lower pair of spring hangers 70, as shown in FIG. 2. The upper pair of spring hangers 72 is positioned such that the linear distance from the floor surface 30 to the upper pair of spring hangers 72 is less than the maximum unsupported distance designated by the busway manufacturer. Similarly, the linear distance from the upper pair of spring hangers 72 to the ceiling surface should also be less than the maximum unsupported distance designated by the busway manufacturer. The maximum unsupported distance is typically either ten feet or sixteen feet, but can be any other distance designated by the busway manufacturer.

The intermediate busway support 10 of this aspect can also include one or more cross braces 60, 64 for structural support. For example, FIG. 2 illustrates first and second cross braces 60, 64 to provide transverse support to the frame 35. The first cross brace 60 can be removably or fixedly attached to the first and second vertical struts 40, 42. The second cross brace 64 can be removably or fixedly attached to the third vertical strut 46 and the fourth vertical strut. The first and second cross braces 60, 64 can be attached using mechanical hardware, welding, or any other suitable mechanism or process.

In other aspects, the first and/or the second cross braces 60, 64 can have an adjustable length such that their lengths can be changed to accommodate different spacing between vertical struts. For example, each cross brace 60, 64 can include a threaded component allowing the length of the cross brace 60, 64 to be adjusted. In another example, each cross brace 60, 64 can include internal and external components such that the internal component slides in relation to the external component to change the length of the cross brace 60, 64, where the amount of extension can be fixed using a pin or a bolt through apertures, by welding, or by any other suitable mechanism. In still other aspects, the circumstances of a given installation can require the re-sizing of frame components and/or additional vertical struts, horizontal supports, and cross braces, as determined by a structural engineer.

FIG. 3 illustrates a variation of the aspect illustrated in FIG. 2. FIG. 3 illustrates an intermediate busway support 10 configured to accommodate two busways 20, 21. The second vertical busway 21 supported in this aspect is generally rectangular in horizontal cross section and includes third and fourth lateral faces 22, 28 connecting third and fourth transverse faces 27, 29. The busways 20, 21 can be identical or dissimilar and are typically generally parallel.

The intermediate busway support 10 of this aspect includes a frame 35 of the type described with respect to the aspect illustrated in FIG. 2, where the frame 35 in both aspects includes first vertical strut 40, second vertical strut 42, third vertical strut 46, and the fourth vertical strut; first, second, third, and fourth horizontal supports 50, 52, 56, 58; lower and upper pairs of spring hangers 70, 72; optional cross braces 60, 64; and optional additional horizontal supports.

The intermediate busway support 10 in this aspect includes a third pair of spring hangers 74 arranged similarly to the lower pair of spring hangers 70. The third pair of spring hangers 74 can be attached directly to the floor surface 30. In another aspect of the present disclosure, the third pair of spring hangers 74 can be attached to the third and fourth horizontal supports 56, 58. One of the third pair of spring hangers 74 can be attached to the third horizontal support 56 and to the third lateral face 22 of the second vertical busway 21. The other of the third pair of spring hangers 74 can be attached to the fourth horizontal support 58 and to the fourth lateral face 28 of the second vertical busway 21.

The intermediate busway support 10 in this aspect also includes a fourth pair of spring hangers 76. The fourth pair of spring hangers 76 can be attached to the first and second horizontal supports 50, 52. One of the fourth pair of spring hangers 76 can be attached to the first horizontal support 50 and to the third lateral face 22 of the second vertical busway 21. The other of the fourth pair of spring hangers 76 can be attached to the second horizontal support 52 and to the fourth lateral face 28 of the second vertical busway 21.

Each of the fourth pair of spring hangers 76 is vertically spaced apart from one of the third pair of spring hangers 74, as shown in FIG. 3. The fourth pair of spring hangers 76 is positioned such that the linear distance from the floor surface 30 to the fourth pair of spring hangers 76 is less than the maximum unsupported distance designated by the busway manufacturer. Similarly, the linear distance from the fourth pair of spring hangers 76 to the ceiling surface should also be less than the maximum unsupported distance designated by the busway manufacturer. The maximum unsupported distance is typically either ten feet or sixteen feet, but can be any other distance designated by the busway manufacturer.

In still other aspects of the present disclosure, the intermediate busway support 10 can be expanded to accommodate three or more busways (not shown). Each additional busway will add an additional lower pair of spring hangers and an additional upper pair of spring hangers, attached as described above. Supporting additional busways can also require the re-sizing of frame components and/or additional vertical struts, horizontal supports, and cross braces, as determined by a structural engineer.

Figure 4:
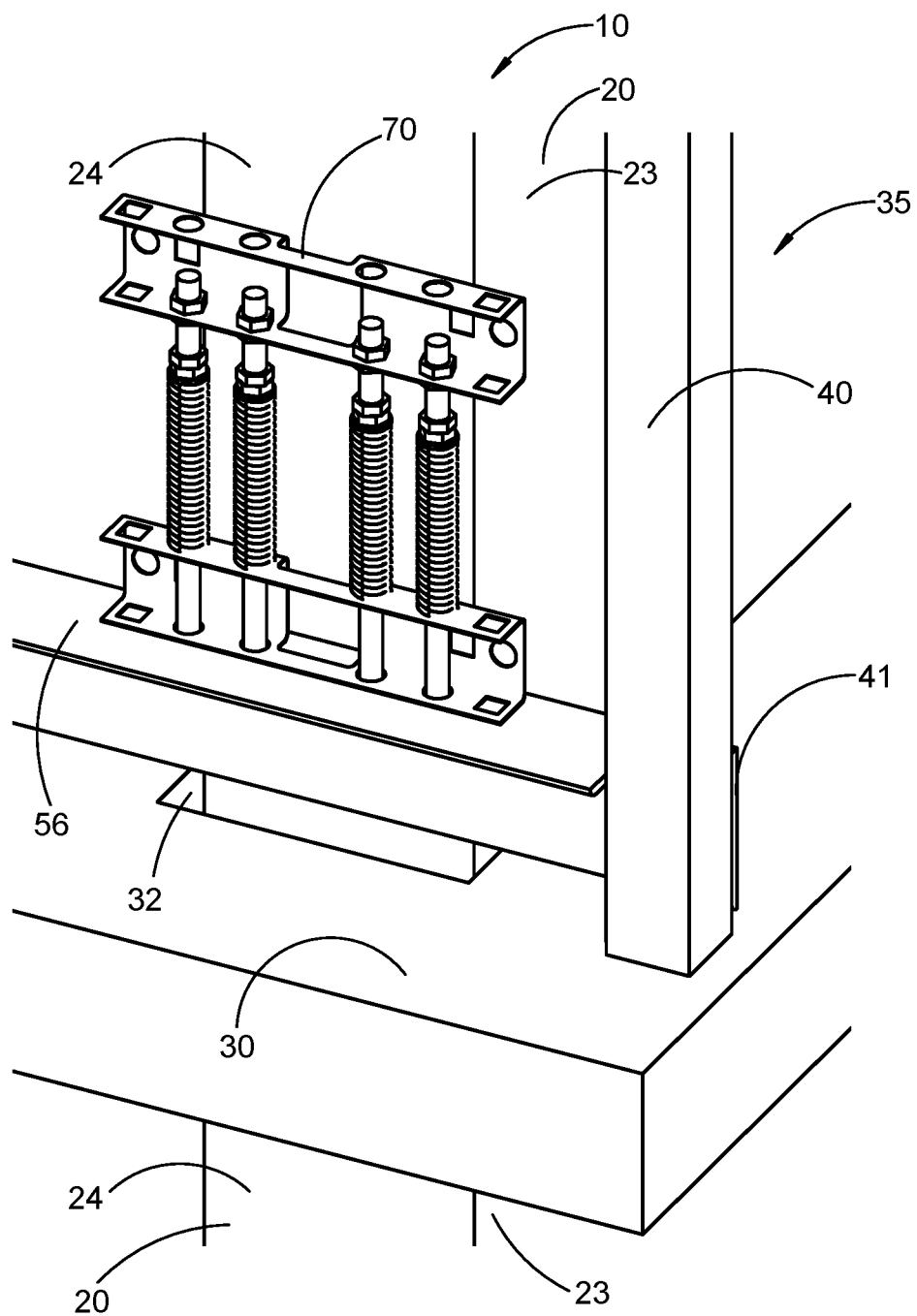
FIG. 4 representatively illustrates a close-up partial perspective view of the intermediate busway support of FIG. 3.

FIG. 4 illustrates a portion of the intermediate busway support 10 of FIG. 3. Busway 20 passes through an aperture 32 in the floor 30. The busway 20 is supported in part by one of the first pair of spring hangers 70, which is attached to the first lateral face 24 of the busway 20 and to the third horizontal support 56. The proximal end 41 of the first vertical strut 40 is attached to the floor 30 and to the third horizontal support 56.

While the disclosure has been described in detail with respect to specific aspects thereof, it will be appreciated that those skilled in the art, upon attaining understanding of the foregoing will readily appreciate alterations to, variations of, and equivalents to these aspects. Accordingly, the scope of the present disclosure should be assessed as that of the appended claims and any equivalents thereto. Additionally, all combinations and/or sub-combinations of the disclosed aspects, ranges, examples, and alternatives are also contemplated.

What is claimed:

1. An apparatus for providing support to a first vertical busway extending between a floor surface and a ceiling surface of a single level, the first vertical busway having first and second lateral faces, the apparatus comprising:
    a frame having first and second vertical struts, wherein the first vertical strut is attached to the floor surface adjacent the first lateral face, and wherein the second vertical strut is attached to the floor surface adjacent the second lateral face;
    a lower pair of hangers each attached to the floor surface, wherein one of the lower pair of hangers is attached to the first lateral face, and wherein the other of the lower pair of hangers is attached to the second lateral face; and
    an upper pair of hangers vertically spaced apart from the lower pair of hangers, wherein one of the upper pair of hangers is attached to the first vertical strut and to the first lateral face, wherein the other of the upper pair of hangers is attached to the second vertical strut and to the second lateral face, and wherein the upper pair of hangers is spaced to be intermediate between and spaced apart from the floor surface and the ceiling surface.

2. The apparatus of claim 1, further comprising third and fourth vertical struts paralleling the first and second vertical struts.

3. The apparatus of claim 2, further comprising a first horizontal support connecting the first and third vertical struts, and a second horizontal support connecting the second and fourth vertical struts.

4. The apparatus of claim 3, wherein one of the upper pair of hangers is attached directly to the first horizontal support, and wherein the other of the upper pair of hangers is attached directly to the second horizontal support.

5. The apparatus of claim 3, further comprising a third horizontal support connecting the first and third vertical struts and a fourth horizontal support connecting the second and fourth vertical struts.

6. The apparatus of claim 5, wherein one of the lower pair of hangers is attached to the third horizontal support, and wherein the other of the lower pair of hangers is attached to the fourth horizontal support.

7. The apparatus of claim 1, wherein the upper pair of hangers is positioned such that linear distances from the floor surface to the upper pair of hangers and from the upper pair of hangers to the ceiling surface are both less than 16 feet.

8. The apparatus of claim 1, wherein the upper pair of hangers is positioned such that linear distances from the floor surface to the upper pair of hangers and from the upper pair of hangers to the ceiling surface are both less than 10 feet.

9. The apparatus of claim 1, wherein the lower pair of hangers are spring hangers.

10. The apparatus of claim 1, wherein the upper pair of hangers are spring hangers.

11. The apparatus of claim 1, further comprising a cross brace extending between the first vertical strut and the second vertical strut.

12. The apparatus of claim 11, wherein the cross brace has a cross brace length, and wherein the cross-brace length is adjustable.

13. The apparatus of claim 1, wherein the floor surface is a curb.

14. The apparatus of claim 5, further comprising support for a second vertical busway extending between the floor surface and the ceiling surface adjacent the first busway, the second busway having third and fourth lateral faces, the support including a third pair of hangers each attached to the third and fourth horizontal supports, wherein one of the third pair of hangers is attached to the third lateral face, and wherein the other of the third pair of hangers is attached to the fourth lateral face; and
    a fourth pair of hangers vertically spaced apart from the third pair of hangers, wherein one of the fourth pair of hangers is attached to the first horizontal support and to the third lateral face, and wherein the other of the fourth pair of hangers is attached to the second horizontal support and to the fourth lateral face.

15. The apparatus of claim 14, further comprising a third busway having associated pairs of hangers.

16. An apparatus for providing support to a first vertical busway extending between a floor surface and a ceiling surface of a single level, the first vertical busway having first and second lateral faces, the apparatus comprising:
    a frame having first, second, third, and fourth vertical struts, wherein the first and third vertical struts are attached to the floor surface adjacent the first lateral face, and wherein the second and fourth vertical struts are attached to the floor surface adjacent the second lateral face;
    a first horizontal support connecting the first and third vertical struts;
    a second horizontal support connecting the second and fourth vertical struts;
    a lower pair of hangers each attached to the floor surface, wherein one of the lower pair of hangers is attached to the first lateral face, and wherein the other of the lower pair of hangers is attached to the second lateral face; and
    an upper pair of hangers vertically spaced apart from the lower pair of hangers, wherein one of the upper pair of hangers is attached to the first horizontal support and to the first lateral face, wherein the other of the upper pair of hangers is attached to the second horizontal support and to the second lateral face, and wherein the upper pair of hangers is spaced to be intermediate between and spaced apart from the floor surface and the ceiling surface.

17. The apparatus of claim 16, further comprising a cross brace extending between the first vertical strut and the second vertical strut.

18. An apparatus for providing support to first and second vertical busways extending between a floor surface and a ceiling surface of a single level, the first vertical busway having first and second lateral faces, the second vertical busway having third and fourth lateral faces, the apparatus comprising:
    a frame having first, second, third, and fourth vertical struts, wherein the first and third vertical struts are attached to the floor surface adjacent the first lateral face, and wherein the second and fourth vertical struts are attached to the floor surface adjacent the second lateral face;
    a first horizontal support connecting the first and third vertical struts;
    a second horizontal support connecting the second and fourth vertical struts;
    a lower pair of hangers each attached to the floor surface, wherein one of the lower pair of hangers is attached to the first lateral face, and wherein the other of the lower pair of hangers is attached to the second lateral face;
    an upper pair of hangers vertically spaced apart from the lower pair of hangers, wherein one of the upper pair of hangers is attached to the first horizontal support and to the first lateral face, wherein the other of the upper pair of hangers is attached to the second horizontal support and to the second lateral face, and wherein the upper pair of hangers is spaced to be intermediate between and spaced apart from the floor surface and the ceiling surface;
    a third pair of hangers each attached to the floor surface, wherein one of the third pair of hangers is attached to the third lateral face, and wherein the other of the third pair of hangers is attached to the fourth lateral face; and
    a fourth pair of hangers vertically spaced apart from the third pair of hangers, wherein one of the fourth pair of hangers is attached to the first horizontal support and to the third lateral face, and wherein the other of the fourth pair of hangers is attached to the second horizontal support and to the fourth lateral face.

19. The apparatus of claim 18, further comprising a third horizontal support connecting the first and third vertical struts and a fourth horizontal support connecting the second and fourth vertical struts, wherein one of the lower pair of hangers and one of the third pair of hangers are attached to the third horizontal support, and wherein the other of the lower pair of hangers and the other of the third pair of hangers are attached to the fourth horizontal support.

* * * * *